(No Model.)

M. NEWELL & J. O. LITTEN.
TWO WHEELED VEHICLE.

No. 344,129. Patented June 22, 1886.

Witnesses:
Geo. H. Strong.

Inventors,
Milton Newell
Jno. O. Litten
By Dewey & Co.
attys

UNITED STATES PATENT OFFICE.

MILTON NEWELL AND JOSEPH O. LITTEN, OF FRESNO CITY, CALIFORNIA.

TWO-WHEELED VEHICLE.

SPECIFICATION forming part of Letters Patent No. 344,129, dated June 22, 1886.

Application filed April 15, 1886. Serial No. 199,028. (No model.)

*To all whom it may concern:*

Be it known that we, MILTON NEWELL and JOSEPH O. LITTEN, both of Fresno City, Fresno county, State of California, have invented an Improvement in Two-Wheeled Vehicles; and we hereby declare the following to be a full, clear, and exact description of the same.

Our invention relates to that class of two-wheeled vehicles known as "carts;" and it consists in the peculiar arrangement of springs, a frame carried thereby, and thorough-braces on the frame for carrying the body, and in novel adjustable jacks for supporting the springs and adjusting the body, all of which we shall hereinafter fully describe.

The object of our invention is to do away with the unpleasant motion which the rider receives in vehicles of this class, and which is occasioned by the jogging of the horse, and also to provide a simple and effective means for adjusting the body.

Figure 1:
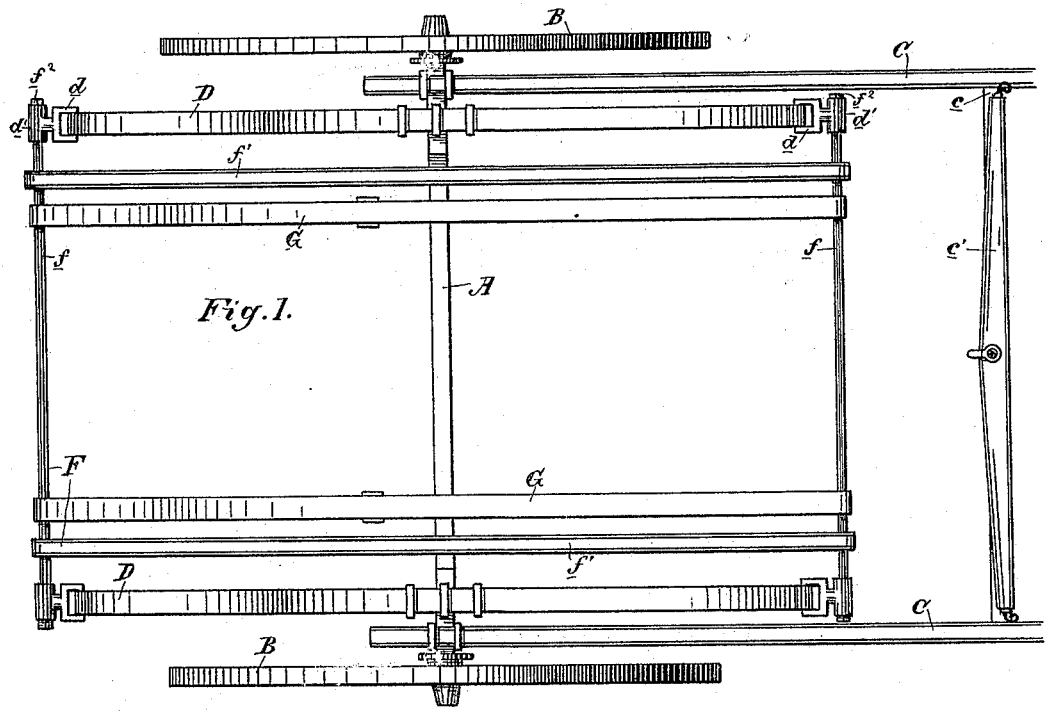
Figure 2:
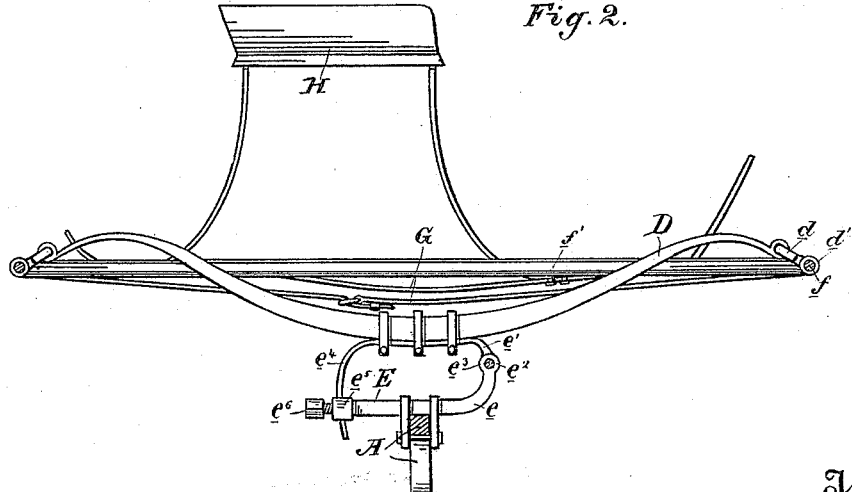

Referring to the accompanying drawings for a more complete explanation of our invention, Figure 1 is a plan view of our vehicle, the body being removed. Fig. 2 is a side elevation of the vehicle, the wheels being removed.

A is the axle, here shown as of the drop-axle pattern, though it may be of any other style.

B are the wheels.

C are the shafts, of any suitable pattern. They are clipped solidly to the axle just within the journals, and they have the usual cross-bar, $c$, and whiffletree $c'$.

D are the springs. These are of the half-elliptic or platform style, and they are supported from the axle through the intervention of the adjustable jacks E, which we shall presently describe. The ends of the springs have links $d$, terminating in ferrules $d'$ at right angles.

F is a frame comprising the cross-bars $f$ and longitudinal bars $f'$. The cross-bars extend between the ends of the springs, their ends passing through the ferrules $d'$ and secured by nuts $f^2$, and the longitudinal bars are secured to the cross-bars.

G are thorough-braces extending between and supported by the cross-bars $f$ of frame F.

The body H rests wholly upon the thorough-braces, either directly or on rockers, but its whole weight is borne by the thorough-braces.

The spring-jacks E, supporting the springs and securing them to the axle, consist of a lower arm or part, $e$, and an upper arm or part, $e'$, the latter being hinged or pivoted at its forward end to the former by any suitable means, as by the embracing-jaws $e^2$ and cross-bolt $e^3$. This joint is to enable the upper arm to be raised or lowered. From the rear end of the upper arm projects downwardly an arm, $e^4$, which passes through a socket, $e^5$, in the rear end of the lower arm, and is fixed where adjusted by a set-screw, $e^6$. Thus the upper arm can be adjusted vertically and fixed where desired. The lower arm or part $e$ of the jack is clipped solidly on the upper arm or part $e'$.

It will be seen from the construction that by adjusting the jacks, the springs, the frame, and the thorough-braces are all moved, and the body is thereby properly adjusted.

By the general construction and arrangement of parts enough independence is given to the body to enable it to counteract the motion of the shafts, and to remain steady, instead of rocking back and forth, as the bodies of ordinary carts do. The rider will therefore experience no unpleasant motion, but will find the vehicle as comfortable as possible.

Having thus described our invention, what we claim as new, and desire to secure by Letters Patent, is—

1. In a two-wheeled vehicle, the frame F, carried by the springs and comprising the cross-bars $f$ and longitudinal bars $f'$, in combination with the body-supporting thorough-braces G, secured to said frame between the longitudinal bars, substantially as herein described.

2. In a two-wheeled vehicle, the combination, with the half-elliptic springs D, secured to jacks clipped to the axle, of the frame F, comprising longitudinal and cross bars carried by the springs, and the body-supporting thorough-braces G, secured to said cross-bars, substantially as herein described.

3. In a two-wheeled vehicle, the half-elliptic springs D, carried by the axle in combination with the cross-bars $f$, extending between and secured to the ends of the springs, and the body-supporting thorough-braces secured to and extending between the cross-bars, substantially as herein described.

4. In a two-wheeled vehicle, the springs D, carried by the axle and having in their ends the links $d$ with ferrules $d'$, in combination with the cross-bars $f$, extending between the ends of the springs and secured in the ferrules by nuts, and the thorough-braces G, secured to and extending between the cross-bars, substantially as herein described.

5. In a two-wheeled vehicle, the wheeled axle A, shafts C, rigidly clipped thereto, and the springs D, carried by the axle, in combination with the frame F, consisting of cross-bars $f$, extending between and secured to the ends of the springs, and longitudinal bars $f'$, connecting the cross-bars, the thorough-braces G, secured to and extending between the cross-bars, and the body H, carried by the thorough-braces, substantially as herein described.

6. In a two-wheeled vehicle, the axle A and springs D, in combination with the jacks E, clipped to said axle and springs, and consisting of a lower arm or part, $e$, and an upper arm or part, $e'$, hinged or jointed to the lower arm, and having a downwardly-extending arm, $e^4$, passing through and secured to the end of the lower arm, substantially as herein described.

7. In a two-wheeled vehicle, the axle A and springs D, in combination with the jacks E, connecting the two, said jacks consisting of a lower arm or part, $e$, clipped to the axle, an upper arm or part, $e'$, hinged at one end to the lower arm or part and clipped to the spring, an arm, $e^4$, from the other end of the upper arm or part passing down through the end of the lower arm or part, and a set-screw, $e^6$, for fixing said arm $a^4$ where adjusted, substantially as and for the purpose herein described.

8. In a two-wheeled vehicle, the axle, shafts, springs, frame, and body-supporting thorough-braces, all as described, in combination with the adjustable jacks E, connecting the springs to the axle and adjusting the body of the vehicle, said jacks consisting of the hinged arms or parts $e$ $e'$, the arm $a^4$, and set-screw $e^6$, all arranged and adapted to operate substantially as herein described.

In witness whereof we have hereunto set our hands.

MILTON NEWELL.
JOSEPH O. LITTEN.

Witnesses:
LUCIEN SHAW,
J. F. WHARTON.